United States Patent
Kowalski

(10) Patent No.: US 7,123,627 B2
(45) Date of Patent: Oct. 17, 2006

(54) CLASS OF COMPUTATIONALLY PARSIMONIOUS SCHEDULERS FOR ENFORCING QUALITY OF SERVICE OVER PACKET BASED AV-CENTRIC HOME NETWORKS

(75) Inventor: John M. Kowalski, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 951 days.

(21) Appl. No.: 10/067,567

(22) Filed: Feb. 4, 2002

(65) Prior Publication Data

US 2003/0063563 A1  Apr. 3, 2003

(51) Int. Cl.
*H04J 3/16* (2006.01)
(52) U.S. Cl. .................. 370/468; 370/337; 370/348
(58) Field of Classification Search ........... 370/337, 370/468, 348
See application file for complete search history.

(56) References Cited

U.S. PATENT DOCUMENTS

| | | | |
|---|---|---|---|
| 5,638,371 A | | 6/1997 | Raychaudhuri et al. |
| 5,677,909 A | * | 10/1997 | Heide .................. 370/347 |
| 6,011,590 A | * | 1/2000 | Saukkonen ........... 375/240.05 |
| 6,049,549 A | | 4/2000 | Ganz et al. |
| 6,094,426 A | | 7/2000 | Honkasato et al. |
| 6,157,614 A | | 12/2000 | Pasternak et al. |
| 6,229,795 B1 | | 5/2001 | Pankaj et al. |
| 6,262,980 B1 | | 7/2001 | Leung et al. |
| 6,442,164 B1 | * | 8/2002 | Wu .................... 370/395.21 |
| 6,795,418 B1 | * | 9/2004 | Choi .................... 370/336 |
| 2001/0033560 A1 | * | 10/2001 | Tong et al. .............. 370/337 |
| 2002/0105970 A1 | * | 8/2002 | Shvodian ................ 370/468 |
| 2002/0131414 A1 | * | 9/2002 | Hadzic .................. 370/393 |
| 2003/0012176 A1 | * | 1/2003 | Kondylis et al. .......... 370/348 |

FOREIGN PATENT DOCUMENTS

| | | |
|---|---|---|
| EP | 1 117 211 A2 | 7/2001 |
| JP | 09-106380 | 4/1997 |
| WO | WO 02/07388 A2 | 1/2002 |

OTHER PUBLICATIONS

Subnet Bandwidth Manager (SBM) RFC2814: A Protocol for RSVP-based Admission Control V. IEEE 802-style networks, located at http://www.ietf.org/rfc/rfc2814.txt.
Resources ReSerVation Protocol (RSVP) with Integrated Services RFC2210, located at http://www.ietf.org/rfc/rfc2210.txt.

(Continued)

*Primary Examiner*—Hassan Kizou
*Assistant Examiner*—Anthony Sol
(74) *Attorney, Agent, or Firm*—Robert D. Varitz, PC

(57) ABSTRACT

A scheduler for providing quality of service in a local area network, wherein the local area network includes a plurality of stations, and wherein data flow moves over the network in superframes, includes a mechanism for governing channel resources in the local area network, including a transmit specification controller for granting a transmit specification to a data flow from one station on the network to another station on the network; and a TXOP mechanism for terminating transmits opportunities for stations which have successfully completed data transmission, thereby changing the length of a superframe. A method of providing quality of service in the local area network, includes governing channel resources in the local area network, including controlling transmit specifications for granting a transmit specification to a data flow from one station on the network to another station on the network; and terminating transmits opportunities with a TXOP mechanism for stations which have successfully completed data transmission, thereby changing the length of a superframe.

8 Claims, 2 Drawing Sheets

Superframe with 1 station's allocation

OTHER PUBLICATIONS

A. Mok, et al., *Real-Time Scheduling of Multimedia Tasks*, TR-98-14, located at http://www.cs.utexas.edu/users/UTCS/techreports/index/html/Abstracts.1998.html.

Jin-Meng Ho et al., *Joint Proposal for 802.11e QoS Enhancement*, IEEE 802.11 Documentation 00/120, URL: http://grouper.ieee.org/groups/802/11/Documents.index.html, May 9, 2000.

J. Kowalski et al., *Requirements for High Quality AV Transmission*, IEEE 802.11 Documentation 01/159, URL: http://grouper.ieee.org/groups/802/11/Documents.index.html, Mar. 2001.

J. Kowalski, *802.11e Issues for AV Transport*, IEEE 802.11, Documentation 01/273, URL: http://grouper.ieee.org/groups/802/11/Documents.index.html, May 2001.

* cited by examiner

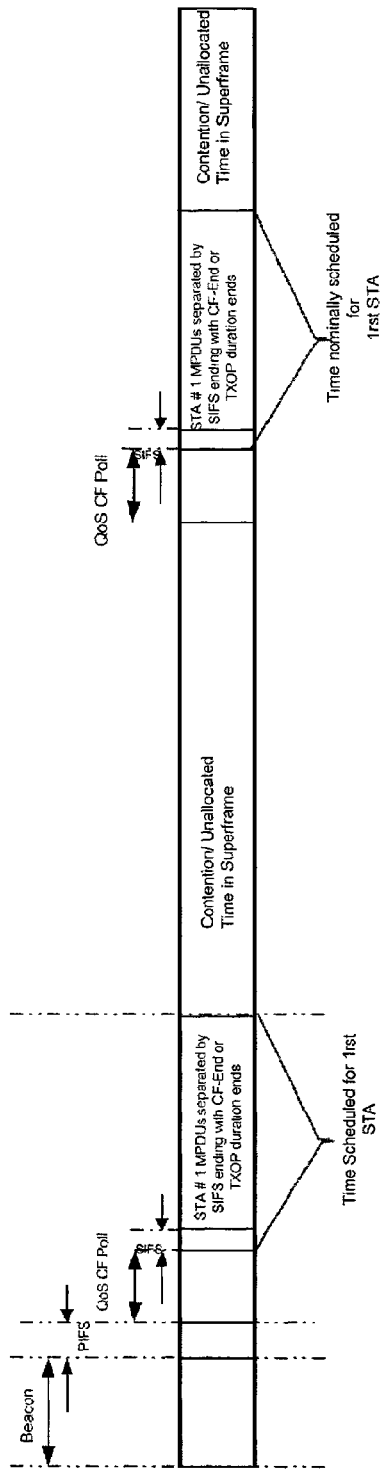
Figure 1. Superframe with 1 station's allocation
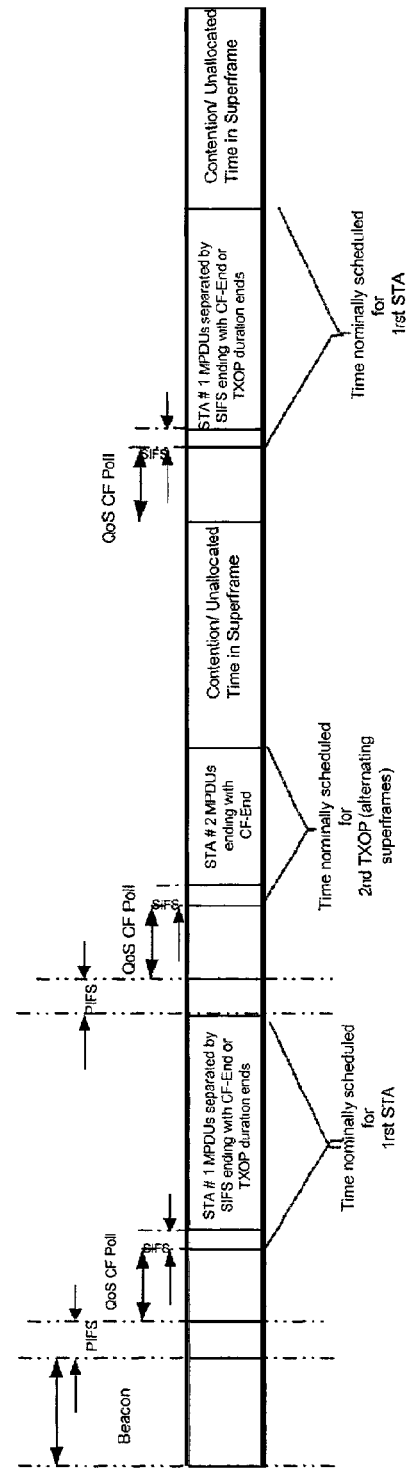
Figure 2. Superframe with 2 stations' allocations

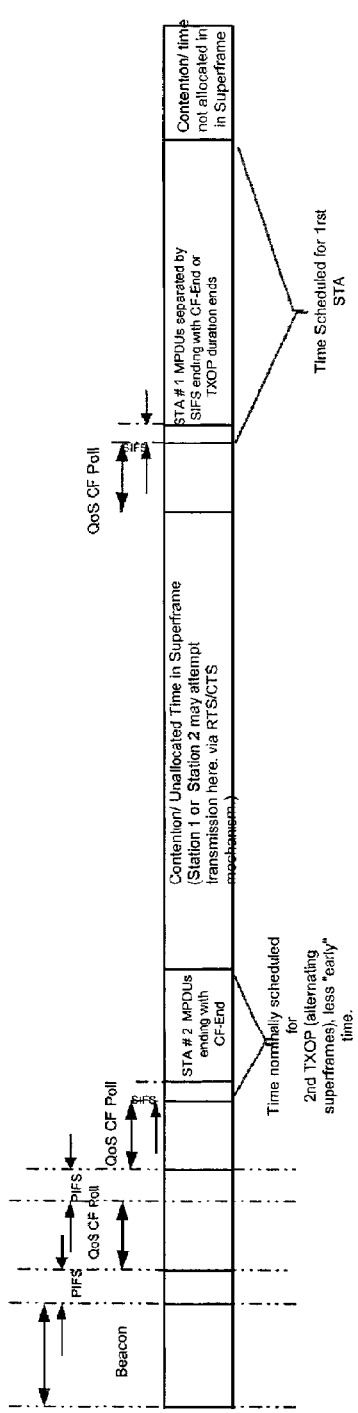
Figure 3. Missed CF-Poll for STA 1.
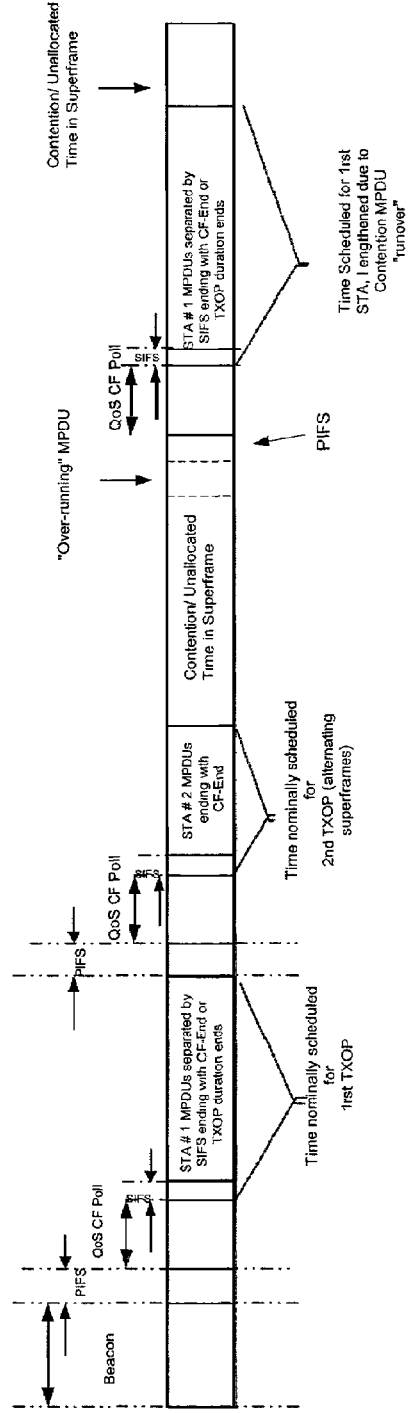
Figure 4. Contention period changes affect on TXOP Duration

CLASS OF COMPUTATIONALLY PARSIMONIOUS SCHEDULERS FOR ENFORCING QUALITY OF SERVICE OVER PACKET BASED AV-CENTRIC HOME NETWORKS

RELATED APPLICATIONS

This application is related to Multimedia Wired/Wireless Content Synchronization System and Method, Ser. No. 09/527,478, filed Mar. 16, 2000; Quality of Service using Wireless LAN; Ser. No. 09/795,539, filed Feb. 28, 2001; and Method to Dynamically Adapt both Modifiable and Non-modifiable Parameters of a Wireless Data Network and Automated Method to Dynamically Change Channels, Ser. No. 09/800,334, filed Mar. 5, 2001.

FIELD OF THE INVENTION

This invention relates to Quality of Service (QoS) in wireless local area networks (LANs), and other networks which utilize a channel with a relatively high error rate, and specifically to a simple scheduler which brings order to an otherwise anarchic system.

BACKGROUND OF THE INVENTION

Providing Quality of Service in wireless networks might be considered to be oxymoronic. The channels used in such networks are not reliable when compared with traditional wired LANs due to range loss, interference from other wireless networks, and other sources of electromagnetic radiation etc. The term "Quality of Service" as used herein may be understood to be the transmission of data subject to meeting certain defined objectives for latency, jitter, throughput, and error rate, i.e., the rate at which packets are dropped.

As innovations in modulation and coding have provided more reliable communication at higher data rates, the possibility of the provision of QoS for wireless networks becomes feasible. The IEEE 802.11e Task Group of the IEEE 802.11 Wireless LAN Working Group has proposed QoS expansions to the 802.11 standard. Such QoS in wireless LAN will allow this standard to make the transmission of audio visual (AV) content using this technology feasible for the home network. Toward this end, this invention describes a scheduling algorithm that will be employed to schedule transmissions over the air in a manner suitable for meeting AV application requirements.

U.S. Pat. No. 6,262,980 to Leung et al., granted Jul. 17, 2001, for Dynamic resource allocation method and apparatus for broadband services in a wireless communications system describes a scheduling algorithm to coordinate the transmission of a number of base stations in a wireless network, but does not teach or suggest how to achieve QoS objectives of latency, jitter, and bandwidth for real-time AV transmission.

U.S. Pat. No. 6,229,795 to Pankaj et al., granted May 8, 2001, for System for allocating resources in a communication system, describes a contention-based allocation of resources.

U.S. Pat. No. 6,157,614 to Pasternak et al., granted Dec. 5, 2000, for Wireless ATM network with high quality of service scheduling, describes a wireless ATM network using per-VC scheduling.

U.S. Pat. No. 6,094,426 to Hokosalo et al., granted Jul. 25, 2000, for Method for scheduling packet data transmission, describes a soft-handoff technique.

U.S. Pat. No. 6,049,549 for Adaptive media control to Ganz et al., granted Apr. 11, 2000, describes a QoS application in a wireless LAN.

U.S. Pat. No. 5,638,371 to Raychaudhuri et al., granted Jun. 10, 1997, for Multiservices medium access control protocol for wireless ATM system describes a control system for a strict TDMA network.

Subnet Bandwidth Manager (SBM) RFC2814: A Protocol for RSVP-based Admission Control V. IEEE 802-style networks, located at http://www.ietf.org/rfc/rfc2814.txt, defines a specification for interaction of SBM clients, however, it does not teach how to schedule transmission opportunities from a stoichioastic or point-coordinated multiple access system.

The use of Resources ReSerVation Protocol (RSVP) with Integrated Services RFC2210, located at http://www.ietf.org/rfc/rfc2210.txt, is described in this Internet Engineering Task Force (IETF) specification, and determines what information elements are sent between RSVP clients to maintain QoS, and describes the information that is passed between bandwidth management entities. The reference does not teach how to implement a policy based on the information.

A. Mok, et al., Real-Time Scheduling of Multimedia Tasks, TR-98-14, located at http://www.cs.utexas.edu/users/UTCS/techreports/index/html/Abstracts.1998.html, describes a technique for determining whether or not a particular task can be scheduled at all over a network.

It further discusses a polling policy based on monitoring data transmission including retransmission statistics, and assigning communication resources includes adjusting data rate requirements in accordance with the collected retransmission statistics. This reference does not describe adaptation of periods for missed polls, nor does it provide a definition of a polling policy to distribute polls and transmit opportunities uniformly on a transmission period.

SUMMARY OF THE INVENTION

A scheduler for providing quality of service in a local area network, wherein the local area network includes a plurality of stations, and wherein data flow moves over the network in Superframes, includes a mechanism for governing channel resources in the local area network, including a transmit specification controller for granting a transmit specification to a data flow from one station on the network to another station on the network; and a transmit opportunity mechanism for terminating transmit opportunities for stations which have successfully completed data transmission, thereby changing the length of a Superframe.

A method of providing quality of service in the local area network, includes governing channel resources in the local area network, including controlling transmit specifications for granting a transmit specification to a data flow from one station on the network to another station on the network; and terminating transmits opportunities with a TXOP mechanism for stations which have successfully completed data transmission, thereby changing the length of a Superframe.

It is an object of the invention to provide a QoS mechanism for a wireless Carrier-Sense Multiple Access (CSMA) Local Area Network (LAN).

Another object of the invention is to provide a method for scheduling of polls by a "point coordinated" function, i.e., a centralized function in a wireless LAN that governs when channel resources are allocated.

A further object of the invention is to provide a polling sequence determination, based on inputs from a Bandwidth Management entity, to maintain QoS objectives of rate, latency, and jitter as presented from the source Media Access Control (MAC) Service Access Point to its corresponding receiver(s) Service Access Points(s).

Another object of the invention is to provide a scheduler whose main function is to allocate transmit opportunities, for streams that have been admitted and granted a transmission specification, in the form of a polling sequence transmitted over the air to various stations.

This summary and objectives of the invention are provided to enable quick comprehension of the nature of the invention. A more thorough understanding of the invention may be obtained by reference to the following detailed description of the preferred embodiment of the invention in connection with the drawings.

BRIEF DESCRIPTION OF THE DRAWINGS

FIG. 1 depicts a nominal TXOP allocation made to a single station.

FIG. 2 depicts an allocation made to a second station.

FIG. 3 depicts the effect of a missed QoS CF-POLL for Station 1.

FIG. 4 depicts the effect of "MPDU run-over."

DETAILED DESCRIPTION OF THE PREFERRED EMBODIMENT

This invention describes a method for scheduling of polls by a "point coordinated" function, i.e., a centralized function in a wireless LAN that governs when channel resources are allocated. The polls appear in the proper time sequence to allow a plurality of wireless LAN stations, referred to herein simply as "stations," to maintain QoS objectives to the higher layers. The polls' scheduling is dynamically updated to account for missed polls, changes in the fundamental period, the "Superframe," due to the stoichioastic duration of contention based traffic, and early termination of Transmit Opportunities (TXOPs) granted to other stations' data flows. A "Superframe" is defined herein as the time between beacon signals transmitted by an access point. A "Beacon Signal" is a signal used to identify the wireless network and to provide timing information.

The method of the invention provides this polling sequence determination, based on inputs from a Bandwidth Management (BWM) entity, to maintain QoS objectives of rate, latency, and jitter as presented from the source MAC Service Access Point (SAP) to its corresponding receiver(s) SAP(s).

As previously noted, the method of the invention provides for scheduling of polls by a "point coordination" function, i.e., a centralized function in a wireless LAN that governs when channel resources are allocated). The point coordination function (PCF) of the invention differs from the legacy 802.11 standard because it allows polls to appear at any time during a Superframe, i.e., a period of time defined for 802.11 systems. The Superframe time in legacy 802.11 systems is typically between 10 msec and 100 msec.

Other differences are present between the prior art and the invention:

1. Prior art network schedulers rely on the fact that the packet based network is a connectionless, queue oriented network. Most schedulers determine particular routes for packets on the network in order to minimize queue size, or to minimize transit time. In effect, they generally operate at the network layer. The IETF 3,4 initiatives in integrated services attempt to provide some form of "parameterized" QoS over the internet, still on the network layer. However, maintenance of real-time QoS objectives, for latency and jitter, is essentially irrelevant to the internet, whereas for consumer AV, such maintenance is paramount. Nobody expects to use a television remote control and wait the amount of time it takes to access a web-broadcast, when they are using a television set only a few feet away from their couch. The mechanism and method of this invention, in contrast to the IETF based QoS efforts, attempts to provide a solution to real-time control of content from the user's perspective.

2. The method of the invention enables scheduling to be done to minimize end-to-end latency and jitter subject to certain throughput/error rate requirements over the air, and only over the air in a wireless LAN. No protocol elements, other than the Physical Layer (PHY)-MAC, an application adaptation/layer/encapsulation layer and the application itself, need be considered. There is, for the purposes of this invention, no network layer, although this invention could interact with QoS elements within a network layer to provide end-to-end QoS.

3. The planned application of the invention is the transmission of consumer AV over a home wireless network. The resulting scheduler, thus is extremely simple relative to the schedulers that exist in packet backbone networks. In those networks, a "shortest route" dynamic programming algorithm is commonly employed, to minimize transmission delay, number of hops, etc. The scheduler of the invention allocates bandwidth for a plurality of stations (STA), or flows from stations, in a uniformly distributed manner in time, adjusting dynamically for failed or prematurely ended transmissions. The scheduler of the invention is extremely simple, computationally, relative to wired packet network schedulers. The scheduler's main function is to allocate transmit opportunities, for streams that have been admitted and granted a Transmission Specification (TSPEC). This allocation takes the form of a polling sequence transmitted over the air to various STAs.

The scheduler of the invention interfaces with the 802.11e bandwidth manager (BM), and the 802.11e stream manager (SM). Upon the admission of a flow, or stream, the bandwidth manager generates, and transmits a TSPEC. A TSPEC is an object that represents QoS objectives related to a given flow of data from one to one or more Enhanced Stations (ESTAs). The scheduler of the invention includes a mechanism for governing channel resources in the local area network, including a transmit specification controller.

The scheduler allocates TXOPs, as needed, to STAs whose flows have been established and granted TSPECS. For all stations with admitted flows, before the start of every Superframe, a set of TXOPs are allocated to each station corresponding to each flow. These TXOPs are made known to the individual ESTAs granted the TXOPs through QoS+ coordination function polls (CF-Polls) that are sent. The scheduler of the invention includes a TXOP mechanism for terminating transmits opportunities for stations which have successfully completed data transmission, thereby changing the length of a Superframe These CF-Polls provide information in the QoS Control Field of the header (§§ 7.2.2 and 7.1.3.5 of IEEE 802.11e) which the ESTAs can use to send one or more MAC Service Data Units (MSDUs), not exceeding duration of the TXOP limit.

During each Superframe, polls are sent. The Hybrid Coordinator (HC) listens for responses from CF-Polls. Upon the acknowledgment of reception of data transmitted, or reception of data when the HC is the intended recipient, the HC updates counters indicating successful transmission. This allows queue sizes to be estimated. The foregoing is actually performed by the stream/BW management entities and not by the scheduler. The scheduler's function is merely to schedule, and to recover data when polls are incorrectly received, or when TXOPs are prematurely terminated.

The scheduler of the invention needs knowledge of: (1) Superframe size and other Management Information Block (MIB) parameters; (2) streams admitted and their TSPECs, which is assumed to include retry information, i.e., it is assumed that the TSPECs are not changed until the scheduler is instructed to change them from the bandwidth manager; and (3) flow statistics.

The scheduler (1) performs a transformation of TSPEC into specific allocations of time to be allocated to stations in the Superframe; and (2) creates a polling sequence corresponding to TXOP allocations. This sequence is periodic, on the average during a Superframe, for Constant Bit Rate (CBR) and Variable Bit Rate (VBR) periodic streams, and is predictive for non-continuous, aperiodic, or unspecified aperiodic streams.

A number of assumptions must be deemed to be true for the scheduler of the invention, and the systems incorporating the scheduler of the invention are constructed and arranged to render these assumptions true:

1. The actual monitoring of TSPEC parameters is done via the Bandwidth (BW), or stream, managers. The scheduler of the invention allocates TXOPs based on a pre-agreed TSPEC. This allocation is done every Superframe.
2. The parameters for a given flow are those as described and interpreted in Table 1 below. The parameters for 802.11a and 802.11e are given in Table 2 below.
3. That during the time in which TXOPs are allocated, the HC is, in fact, able to allocate them, or is able to recover from the lack of being able to allocate them.
4. The HCF access rules of IEEE 802.11e § 9.10 are followed. Specifically:
   4.1 HC senses the WM idle for one PCF Interface Spacing (PIFS), and then transmits first frame of any permitted frame exchange sequence.
   4.2 HC gains control of WM to send QoS traffic to ESTAs and to issue QoS+CF-Polls to ESTAs by waiting a shorter time than E-DCF STAs. (§ 9.10.1).
   4.3 TXOPs do not extend across Target Beacon Transmit Time (TBTT), dot11CFPMaxDuration, if during CFP, or dot11MediumOccupancyLimit, i.e., the maximum amount of time, in a time unit (TU) that a Point Coordinator (PC) may control the usage of the wireless medium w/o relinquishing control for long enough to allow at least one instance of Distributed Coordination Function (DCF) access to the medium.
   4.4 Contention Free Period (CFP) follows beacon, and is ended by CF-END from HC.
   4.5 Implicitly, multiple packets may be sent per TXOP.
5. The bandwidth manager and the scheduler will interact in such a way as the bandwidth manager uses the scheduling algorithm to make decisions on admittance of streams, the scheduler knows when polls are not received and informs the bandwidth manager of the above, and the bandwidth manager keeps track of successful deliveries of MSDUs.
6. There is sufficient link margin to support the TSPEC/ allocation. The scheduler will not check for this margin, the scheduler will only (de)allocate TXOPs. Should the link characteristics change, the Bandwidth Manager is charged with the updating of a TSPEC.
7. For VBR traffic, the bandwidth manager and scheduler is able to predict the traffic available, i.e., the traffic flow is stationary and ergodic, so that, for a given TSPEC, not only can the average rate be supported, but the peak rate can be known to be achieved a certain percentage of the time.
8. TXOPs are allocated, and the remaining pool of TXOPs are made by the scheduling method of the invention. The scheduler is able to determine, based on the allocation of transmit opportunities, if a new stream can be admitted. At present TXOPs are allocated on the basis of STAs, although other variations are possible within the scope of the invention.

TABLE 1

Transmission Specification Parameters and their meaning

| Term | Meaning |
| --- | --- |
| Polling Interval | Nominal TUs, where 1 TU = 1024 msec, between outgoing MSDUs. For Periodic Traffic: The inter-TX interval. For an accepted periodic TSPEC, the HC "attempts" to provide TXOPs with inter-TXOP spacing, which, in this description, is interpreted as the spacing from the nominal beginning of one TXOP to the nominal beginning of the next TXOP, equal to the Polling Interval value, ± the Jitter Bound. For Aperiodic Traffic: the interval during which the maximum burst size, and minimum and mean data rates are measured. a.k.a. "Committed Time." |
| Minimum Data Rate | Lowest data rate, in octets per Transmit Interval, that is acceptable for transport of MSDUs |
| Mean Data Rate | Nominal sustained data rate, per Transmit Interval.) |
| Maximum Burst Size | Peak data burst, in units of 1024 bytes, that can happen under a TSPEC within a Transmit Interval |
| Transmit Interval. | The usable duration of a polling interval or TXOP. in which MSDUs can actually be transmitted |
| Nominal MSDU Size | "Nominal" size of MSDUs sent under this TSPEC. |
| Inactivity Interval | How long it can be idle . . . |
| Delay Bound | Maximum number of TUs that may elapse before an MSDU under this TSPEC is discarded due to excessive delay. (This is apparently MAC-to-MAC). |
| Jitter Bound | Maximum number of TUs by which the actual intervals between MSDU transmissions for this traffic may vary from the nominal value specified in the Polling Interval field. Symmetric jitter amounts are assumed to be acceptable. |
| TXOP | Unit of allocation of the right to transmit on the wireless medium. Each TXOP is defined by a particular starting time, relative to the end of a preceding frame, and a defined maximum length. The TXOP is obtained by an ESTA receiving a QoS (+) CF-Poll during the CP/CFP or by the ESTA winning an instance of E-DCF contention during the CP. In the case of a polled TXOP the entire TXOP is protected by the NAV. The scheduler here will only schedule polled TXOPS The maximum length of TXOP is: 8176 ms. That is, about 8.18 ms. |

TABLE 2

Parameters Associated With Superframe for 802.11a/e (802.11e D1.1)

| Parameter | Value (or Range) |
| --- | --- |
| TXOP length | 16 ms–8176 ms. (A 16 ms TXOP would be practically useless.) |
| Slot Time | 9 ms |
| SIFS | 16 ms |
| Preamble Duration | 20 ms |
| PIFS | 25 ms (= SIFS + Slot Time) |
| DIFS | 34 ms (= SIFS + 2Slot Times) |
| Maximum Packet Duration | =20 ms (Preamble) + (384 ms) (2308 octet payload, including CRC). |
| Polling Interval Range | 1024 ms to 261120 ms |

Scheduling Algorithm

The scheduler of the invention incorporates a scheduling algorithm for implementing the method of the invention. This algorithm may be used, with only slight modifications which are evident to persons of ordinary skill in the art, if the scheduler is unaware of which flow the STA needs to transmit. The scheduler needs only to be aware of the net amount of time needed to be allocated to STAs to maintain their TSPECs. The scheduling algorithm (1) attempts to allocate TXOPs for each flow for each station uniformly over a Superframe; (2) allocates TXOPs to send at the negotiated rate; wherein (3) low delay/jitter traffic is to be allocated first, with, for the same delay/jitter specs, priority going to CBR traffic.

The scheduling algorithm operates in two modes: (1) for every Superframe, prior to that Superframe, a scheduled allocation of TXOPs, via polls is performed; and (2) During the Superframe, the response to polls is monitored. If there is no transmission from a polled station after a PIFS, then the next flow in the polling list is polled.

The scheduling algorithm of the method of the invention is aware of (1) the number of flows for each STA; (2) the TSPECs for each flow; and (3) the Superframe size, polling interval, and other variables in the MIB.

Prior to each Superframe transmission, and for each Superframe:
1. Rank, assigned by HC or STA, flows in terms of delay/jitter characteristics from the highest delay/jitter to the lowest, with periodic streams winning any ties.
2. For each STA:
    2.1. First, an estimation of periodic traffic is made. This is done in as follows:
    2.1.1 An estimate of the net queue size for each flow is made. If $q_k$ is the state of the queue at Superframe n, then $q_{k+1}$ is estimated as $$q_k + d_k + d^{(2)}_k/2, \quad (1)$$

where $d_k$ is the first difference, i.e., $q_k - q_{k-1}$ and $d^{(2)}_k$ is the second difference, i.e., $q_k - q_{k-2}$. The length of the average TXOPS, $T_{TXOP, Avg}$, are changed then proportionally to the amount of time it takes to transmit the estimated difference in queue length $d_k + d'_k/2$, positive or negative, called $T'_{TXOP, Avg}$ herein.

2.1.2 Initially, the TXOPs size and duration are determined by taking the queue size, and determining how long it takes to transmit that queue size at the negotiated transmit rate, and dividing that time interval into TXOPs that will fit on the Superframe according to jitter/delay bounds.

During successive Superframes, stations' TXOP durations are expanded or contracted based on the actual, i.e., completed, polling interval relative to the requested polling interval:

$$T_{TXOP} = \text{Min}\left(\text{Max}\left(\left(\frac{\text{Actual Polling Interval}}{\text{Nominal Polling Interval}}\right) * T'_{TXOP,Avg},\right.\right. \quad (2)$$

$$\left.\left. T_{TXOP,Min. Data Rate}\right), T_{TXOP,Max. Data Rate}\right)$$

where $T_{TXOP, Avg}$ corresponds to the TXOP duration required to support the mean data rate at the agreed upon transmission rate, and $T_{TXOP, Min. Data Rate}$ and $T_{TXOP, Max. Data Rate}$ corresponds to the minimum data rate and maximum data rates, respectively. Approximations to the division may be made if numerical complexity is a concern. The first calculation is performed to ensure that flows into transmit queues remain stable. The second calculation is done to insure rate matching over the channel is carried out. It is assumed that the bandwidth manager will monitor the length of these allocated TXOPs and re-negotiate TXOP requests if channel capacity is neared or exceeded.

2.2 For STAs that request TXOPs for periodic flows, assign transmissions to TXOPs that are assigned as uniformly spaced on Polling Intervals not overlapping any previous allocations.
   2.3 Assign, for each Polling Interval corresponding to this flow in the Superframe, TXOPs whose length=(Mean Data Rate over polling interval)*(Beacon+DCF period+Retries+Overhead time). (3)

The periodic traffic is assumed to be a long term "connection," however, this may be VBR traffic as well as CBR traffic. However, this traffic may not appear uniformly over the Superframe owing to the Beacon and DCF intervals. The IEEE 802.11e standard is slightly ambiguous in its meaning of the "Data Rates." It is assumed that data rates means the actual payload data that is delivered, which is assumed to be equal to the payload that flows into the MAC during a polling interval, therefore, under a properly defined TSPEC, there is no buffer overflow or underflow, i.e., the scheduling algorithm properly predicts the buffer size.
3. For STAs with aperiodic flows, TXOPS for aperiodic traffic are uniformly spaced on polling intervals, and do not overlapping any previous allocations. For each polling interval corresponding to this flow in the Superframe, TXOPs are assigned whose length=(Mean Data Rate over polling interval)*(Beacon+DCF period+Retries+Overhead time). (4)

4. Finally, a composite schedule is produced based on allocations to individual STAs. These are transmitted to the stations via QoS CF-Polls that are sent to individual stations. At present, in the IEEE 802.11e standard, TXOPs are allocated to stations, not to specific flows. However, because each STA is (a) aware of the flows assigned to it, and (b) aware of the schedule policy, in principle, or by monitoring polling on the channel, the STA is capable of allocating particular flows to particular transmit opportunities.

During each Superframe transmission, and for each Superframe:
1. If a station responds to a CF-Poll, the schedule is maintained.

2. If a station fails to respond to a CF-Poll, then the schedule is changed as follows:

2.1 All succeeding TXOPs are advanced in time, proportional to the net time advanced from the CF-Poll.

2.2 The TXOPs are foreshortened in duration according to Eq. 2–4. For the next Superframe, the nominal schedule is resumed, but with durations of TXOPs expanded according to the above equation.

2.3 Failed CF-Polls from particular stations are recorded and then reported to the BW manager at the end of the Superframe.

2.4 As per IEEE 802.11e § 9.10.1.2, the station failing to respond to a CF-Poll may use the contention period to transmit, provided the contention period is long enough to accommodate the transmission, i.e., the beacon is not expected before the MPDU is transmitted.

3. When a contention interval separates QoS-CF Polls, then the CF-Poll is transmitted when the NAV and the physical carrier sense mechanisms indicate the channel is available. IEEE 802.11e § 9.10.2.1.

Example Application

In this example, the allocation of transmit opportunities to two stations for the duration of a Superframe is considered, and the affect on the polled or transmit opportunities by the occurrence of missed polls as well as by the contention interval are described. For the sake of clarity, the example is for a scenario in which PS-Polls are absent.

Referring now to FIG. 1, a nominal TXOP allocation made to a single station is described. Signalling durations, such as QoS-CF Polls, SIFSs, PIFSs, etc., are not drawn to scale, but are shown enlarged for clarity. The bandwidth manager, through knowledge of the application's bandwidth, delay, and jitter requirements determines the length of transmit opportunities. For example, if the jitter delay is specified to be less than 50 ms, TXOPs should be spaced no further, on the average, than 50 ms apart. Note that some buffering will still be required at the receiver, however, to account for retransmissions, variation in the beacon, etc.

In this example, it is assumed that the flows allocated to Station 1 require the station to be have TXOPs located twice per interval, which are scheduled to be 50 ms apart. If one needs to guarantee that the peak jitter is strictly bounded by 50 ms or less, one needs to over-allocate transmit opportunities, to account for missed transmissions, and/or the possibility that a contention period may be prolonged.

After allocations are made to the first station, an allocation to a second station is made. The second station is assumed to be able to tolerate jitter and delay such that TXOPs are scheduled 100 ms apart. This allocation is shown in FIG. 2.

In FIG. 3, the effect of a missed QoS CF-POLL, is depicted for Station 1. In this case, according to the method of the invention, in the case of a missed QoS CF-Poll, after a PIFS, the HC polls the second station, with the TXOP duration shortened according to the relative time advanced for the QoS CF-Poll:

$$T_{TXOP} = (\text{Actual Polling Interval}/(\text{Polling Interval})) \quad T_{TXOP, Avg}, \quad (5)$$

as heuristically shown in FIG. 3.

In FIG. 4, the effect of "MPDU run-over" on making the TXOP for a scheduled QoS CF-Poll late is depicted. The TXOP for Station 1 is shown lengthened. The succeeding TXOP for Station 1 (not shown) is foreshortened by applying the above equations.

Summary

The invention provides a mechanism and method to schedule CBR flows to meet QoS objectives, and is especially suited for use in SMA systems. The invention is also applicable to periodic VBR as well as aperiodic flows as well. The invention provides for variable size TSPEC and the uniform distribution of TSPECs in an interval to minimize buffer sizes at the transmitter and receiver to more easily meet the QoS objectives of the invention. Additionally, the invention predicts buffer size for TSPEC applications. However, this feature may be simplified, as prediction of the queue size may not need to be done for strict CBR inflows into a transmit queue.

Thus, a method and system for providing QoS in a wireless network has been disclosed. It will be appreciated that further variations and modifications thereof may be made within the scope of the invention as defined in the appended claims.

I claim:

1. In a CSMA/CA local area network, having a plurality of stations, and wherein data flow moves over the network in superframes, a scheduler for providing quality of service, comprising:

a mechanism for governing channel resources in the asynchronous, contention-based, local area network, including a transmit specification controller for granting a transmit specification to a data flow from one station on the network to another station on the network; and a TXOP mechanism for terminating transmit opportunities for stations which have successfully completed data transmission, thereby changing the length of a superframe, wherein said TXOP mechanism, during successive superframes, expands and contracts the TXOP durations of the stations in the network as a function of completed polling interval relative to the requested polling interval, and wherein the TXOP duration is $T_{TXOP}$, and where $$T_{TXOP} = \text{Min}\left(\text{Max}\left(\left(\frac{\text{Actual Polling Interval}}{\text{Nominal Polling Interval}}\right) * T'_{TXOP,Avg}, T_{TXOP,Min.\,Data\,Rate}\right), T_{TXOP,Max\,Data\,Rate}\right)$$

where $T_{TXOP,\,Avg}$ corresponds to the TXOP duration required to support the mean data rate at the agreed upon transmission rate, and $T_{TXOP,\,Min.\,Data\,Rate}$ and $T_{TXOP,\,Max\,Data\,Rate}$ corresponds to the minimum data rate and maximum data rates, respectively.

2. The scheduler of claim 1 which includes a buffer size predictor for predicting the required buffer size as a function of the transmit specification.

3. The scheduler of claim 2 wherein the buffer size predictor minimizes buffer size.

4. A method of providing quality of service in a CSMA/CA local area network, having a plurality of stations, and wherein data flow moves over the network in superframes, comprising:

governing channel resources in the asynchronous, contention-based, local area network, including controlling transmit specifications for granting a transmit specification to a data flow from one station on the network to another station on the network;

setting the length of a TXOP having a variable size with a TXOP mechanism, which, during successive superframes, expands and contracts the TXOP durations of the stations in the network as a function of completed polling interval relative to the requested polling interval, wherein said setting the length of the TXOP includes setting the TXOP duration as $T_{TXOP}$, and where $$T_{TXOP} = \mathrm{Min}\left(\mathrm{Max}\left(\left(\frac{\text{Actual Polling Interval}}{\text{Nominal Polling Interval}}\right) * T'_{TXOP,Avg}, T_{TXOP, Min.\ Data\ Rate}\right), T_{TXOP, Max\ Data\ Rate}\right)$$

where $T_{TXOP,\ Avg}$ corresponds to the TXOP duration required to support the mean data rate at the agreed upon transmission rate, and $T_{TXOP,\ Min.\ Data\ Rate}$ and $T_{TXOP,\ Max\ Data\ Rate}$ corresponds to the minimum data rate and maximum data rates, respectively; and terminating transmit opportunities with a TXOP mechanism for stations which have successfully completed data transmission, thereby changing the length of a TXOP.

5. The method of claim 4 which includes predicting the required buffer size as a function of the transmit specification and channel conditions.

6. The method of claim 5 which further includes minimizing the buffer size.

7. The method of claim 4 which includes predicting the required buffer size as a function of the expected required throughput.

8. The method of claim 7 which further includes minimizing the buffer size.

* * * * *